(12) United States Patent
Dudley (10) Patent No.: US 6,254,118 B1
(45) Date of Patent: Jul. 3, 2001

(54) TRAILER TONGUE JACKKNIFE BLOCKING DEVICE

(75) Inventor: Robert Dudley, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 09/335,027

(22) Filed: Jun. 17, 1999

(51) Int. Cl.[7] .................................................. B62D 53/06
(52) U.S. Cl. ........................ 280/432; 280/507; 280/455.1; 293/117
(58) Field of Search ................................... 280/432, 455.1, 280/511, 446.1, 448, 474, 507; 293/117

(56) References Cited

U.S. PATENT DOCUMENTS

| | | | |
|---|---|---|---|
| 2,692,147 | 10/1954 | Whitney | 280/432 |
| 2,772,894 | 12/1956 | Oats | 280/432 |
| 3,297,340 * | 1/1967 | Rendessy | 280/432 |
| 3,305,246 | 2/1967 | Gonczy et al. | 280/446 |
| 3,393,923 | 7/1968 | Rendessy | 280/432 |
| 3,400,948 * | 9/1968 | Matson | 280/406.2 |
| 3,471,170 | 10/1969 | Rendessy | 280/446 |
| 3,497,241 * | 2/1970 | Jones | 280/455.12 |
| 3,512,803 * | 5/1970 | Hines et al. | 280/432 |
| 3,659,874 | 5/1972 | Rendessy | 280/446 |
| 3,709,542 | 1/1973 | Fehlau et al. | 293/73 |
| 3,756,618 * | 9/1973 | Lewis | 280/489 |
| 3,782,760 | 1/1974 | Mann | 280/467 |
| 3,787,077 | 1/1974 | Sanders | 280/446 B |
| 3,801,133 | 4/1974 | Thompson | 280/406 A |
| 3,828,449 | 8/1974 | Miceli | 37/41 |
| 3,834,480 | 9/1974 | McGee | 180/79.2 B |
| 3,881,577 | 5/1975 | Wherry et al. | 188/112 |
| 3,885,817 | 5/1975 | Christian | 280/491 E |
| 3,905,629 | 9/1975 | Kwong | 293/24 |
| 3,989,268 | 11/1976 | Rawn | 280/432 |
| 4,003,586 | 1/1977 | Luck | 280/446 B |
| 4,025,085 | 5/1977 | Jacobs | 280/446 B |
| 4,092,035 * | 5/1978 | Warner | 280/446.1 |
| 4,247,138 | 1/1981 | Child | 293/103 |
| 4,281,846 | 8/1981 | Hall | 280/432 |
| 4,402,522 | 9/1983 | Ratsko et al. | 280/432 |
| 4,494,765 * | 1/1985 | Ratsko et al. | 280/432 |
| 4,582,337 | 4/1986 | Hsueh | 280/446 B |
| 4,773,668 * | 9/1988 | Muonro | 280/485 |
| 4,798,409 | 1/1989 | Miller | 293/117 |
| 4,811,965 | 3/1989 | Eubanks | 280/455.1 |
| 4,929,008 | 5/1990 | Esfandiary | 293/108 |
| 4,978,133 | 12/1990 | Thorne et al. | 280/484 |
| 5,135,248 | 8/1992 | Keiserman | 280/432 |
| 5,161,815 * | 11/1992 | Penor, Jr. | 280/477 |
| 5,507,546 | 4/1996 | Holley | 293/133 |
| 5,533,743 | 7/1996 | Bello | 280/507 |
| 5,558,351 | 9/1996 | Hunter | 280/432 |
| 5,632,518 | 5/1997 | Kendall | 293/103 |
| 5,660,409 * | 8/1997 | Hensley | 280/455.1 |
| 5,836,603 | 11/1998 | Logan et al. | 280/483 |

* cited by examiner

Primary Examiner—Brian L. Johnson
Assistant Examiner—Deanna Draper
(74) Attorney, Agent, or Firm—Rod S. Berman; Jeffer, Mangels, Butler & Marmaro LLP (57) ABSTRACT

A device for preventing over-articulation of a trailer towed by a towing vehicle. The device includes a bracket and a pair of opposed shock absorbing members affixed to and extending outwardly from the bracket. The bracket includes a horizontally oriented upper portion, a pair of side portions extending downwardly from the upper portion, and at least one opening defined in at least one of the side portions for connecting the device to a trailer tongue.

24 Claims, 7 Drawing Sheets

TRAILER TONGUE JACKKNIFE BLOCKING DEVICE

FIELD OF THE INVENTION

The present invention relates to devices for reducing occurrences of over-articulation of a trailer attached to a towing vehicle.

BACKGROUND OF THE INVENTION

When operating a towing vehicle and a trailer the possibility of the trailer jackknifing exists. Jackknifing is an uncontrollable over-articulation between the towing vehicle and the trailer and can often cause damage to the trailer tongue and/or towing vehicle. Jackknifing often occurs when backing the trailer or when operating the vehicle/trailer combination on a slippery road surface, among other situations. Various anti-jackknifing devices have been previously proposed. However, many of these devices are provided for use with semi-trailers, and not for trailers and towing vehicles having a hitch and detachable coupler (such as a hitchball). Many of the anti-jackknifing devices that have been provided for trailers having a detachable coupler are relatively complex and require added attachments to the towing vehicle.

A long felt need exists for a jackknife prevention device that can be used with a trailer having a hitch ball connector and is relatively simple in design and construction.

SUMMARY OF THE PREFERRED EMBODIMENTS

The present invention provides a device for preventing over-articulation of a trailer towed by a towing vehicle. One embodiment of the preferred device includes a connection member and a contact portion affixed to and extending outwardly from the connection member. The connection member includes a horizontally oriented upper portion, a pair of side portions extending downwardly from the upper portion, and at least one opening defined in at least one of the side portions so that the device can be secured to the tongue of the trailer. The contact portion includes a middle portion having opposite ends, a pair of end portions affixed to the opposite ends of the middle portion, and a pair of shock absorbing members each affixed to an outer surface of the end portions. The end portions each have an upper portion that is bent inwardly.

The present invention also provides a method of preventing contact of a trailer tongue with a rear portion of a towing vehicle. The preferred method includes the steps of affixing a body to the trailer tongue, wherein the body extends outwardly of the tongue, articulating the trailer tongue with respect to the rear portion of the towing vehicle, and contacting the body with the rear portion of the towing vehicle.

In accordance with yet another embodiment of the present invention there is provided a trailer and towing vehicle in combination. The trailer has a tongue with a body affixed thereto. The body extends outwardly of the tongue.

In accordance with yet another embodiment of the present invention there is provided a device for preventing over-articulation of a trailer towed by a towing vehicle that includes a bracket and a pair of opposed shock absorbing members affixed to and extending outwardly from the bracket. The bracket includes a horizontally oriented upper portion, a pair of side portions extending downwardly from the upper portion, and at least one opening defined in at least one of the side portions for connecting the device to a trailer tongue.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

With reference generally to FIGS. 1–5, a first embodiment of a jackknife blocking device 10 is shown. The jackknife blocking device 10 generally includes a contact portion 12 and a connection member 14. It will be appreciated that terms such as "upper," "vertical," "horizontal," "bottom," "below," "top," "side," "outwardly," "downwardly" and "lower" used hereinbelow are used merely for ease of description and refer to the orientation of the components as shown in the Figures. It should be understood that any orientation of blocking device 10 described herein is within the scope of the present invention.

Figure 1:
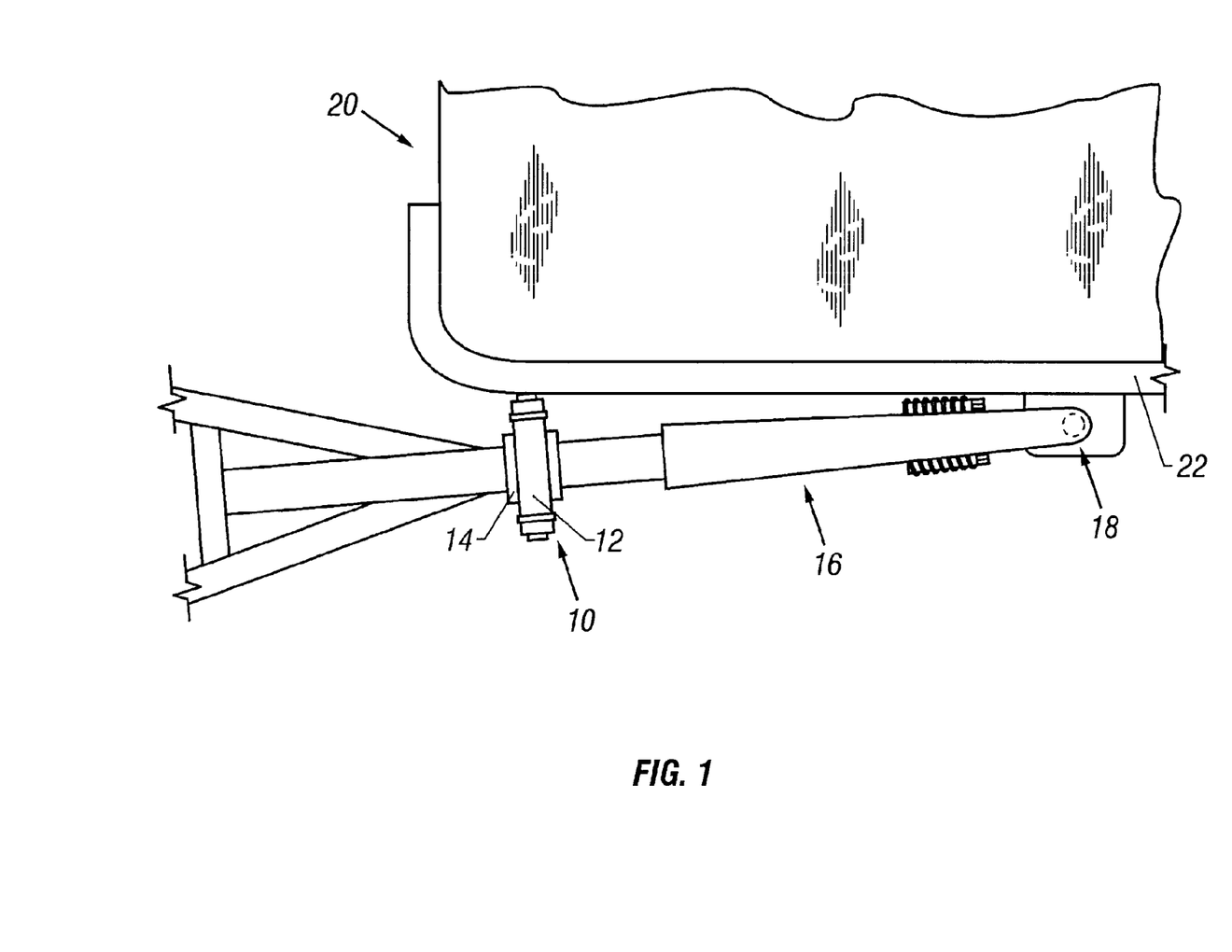
FIG. 1 is a top plan view of a trailer tongue coupled to the rear of a towing vehicle showing a jackknife blocking device affixed to the tongue and in contact with the towing vehicle in accordance with a first embodiment of the present invention.
Figure 2:
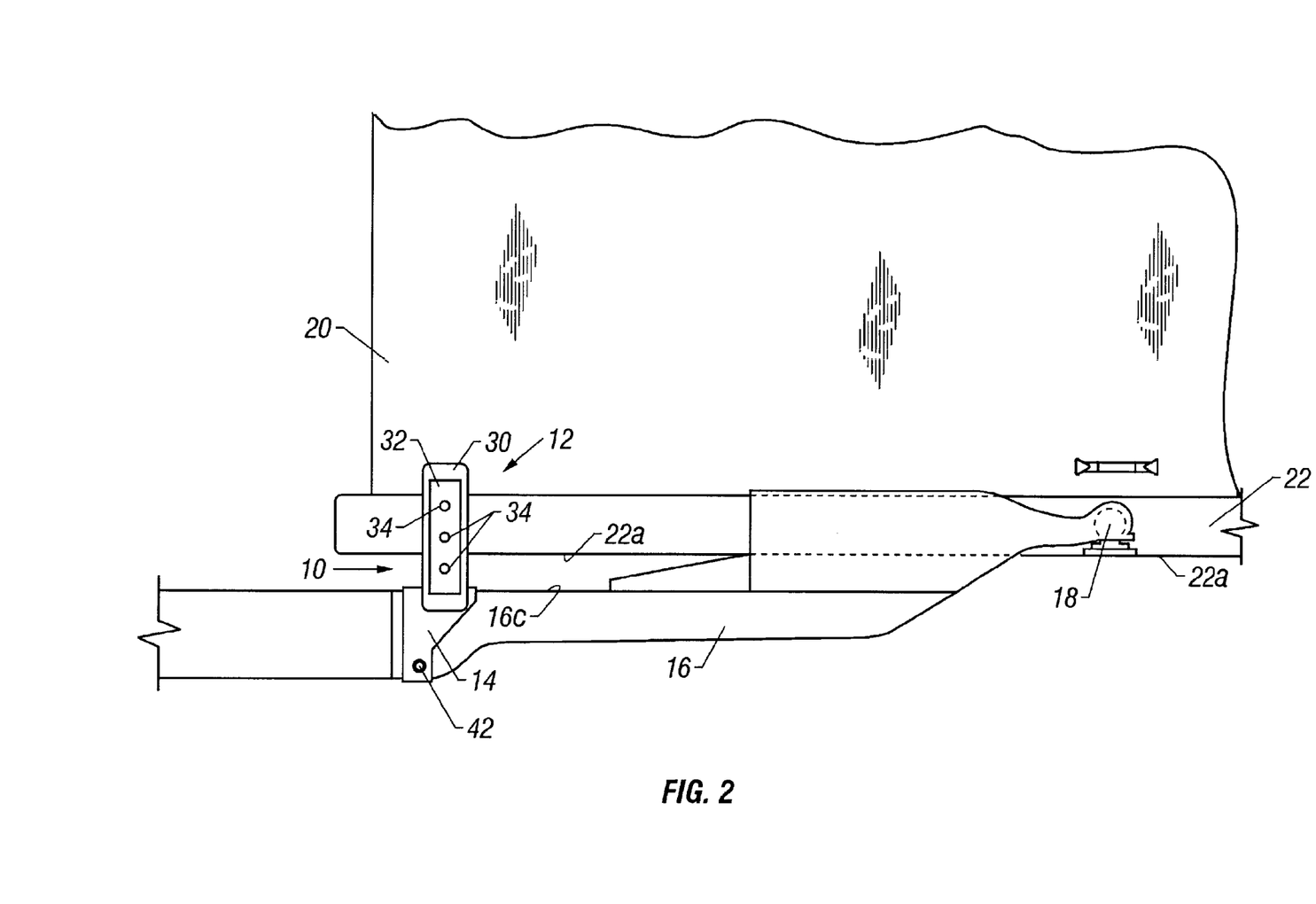
FIG. 2 is a side elevational view of the trailer tongue towing vehicle combination of FIG. 1.

Referring to FIGS. 1 and 2, blocking device 10 is generally intended to reduce occurrence of over-articulation of a trailer tongue 16 that is connected via a detachable coupler 18 to a towing vehicle 20. Typically, when a trailer is towed behind a towing vehicle 20 the tongue 16 extends substantially perpendicularly away from the rear portion, in particular the rear bumper 22 of the towing vehicle 20. However, under certain conditions, for example backing, the trailer and tongue 16 may articulate to a position wherein damage (bending, cosmetic or otherwise) to the tongue 16 or towing vehicle 20 may occur. For example, if the tongue 16 exceeds a position parallel to the rear bumper 22, as shown in FIG. 1, such damage may occur. The present invention substantially minimizes this type of damage by preventing the tongue 16 from coming in contact with the towing vehicle 20.

Figure 3:
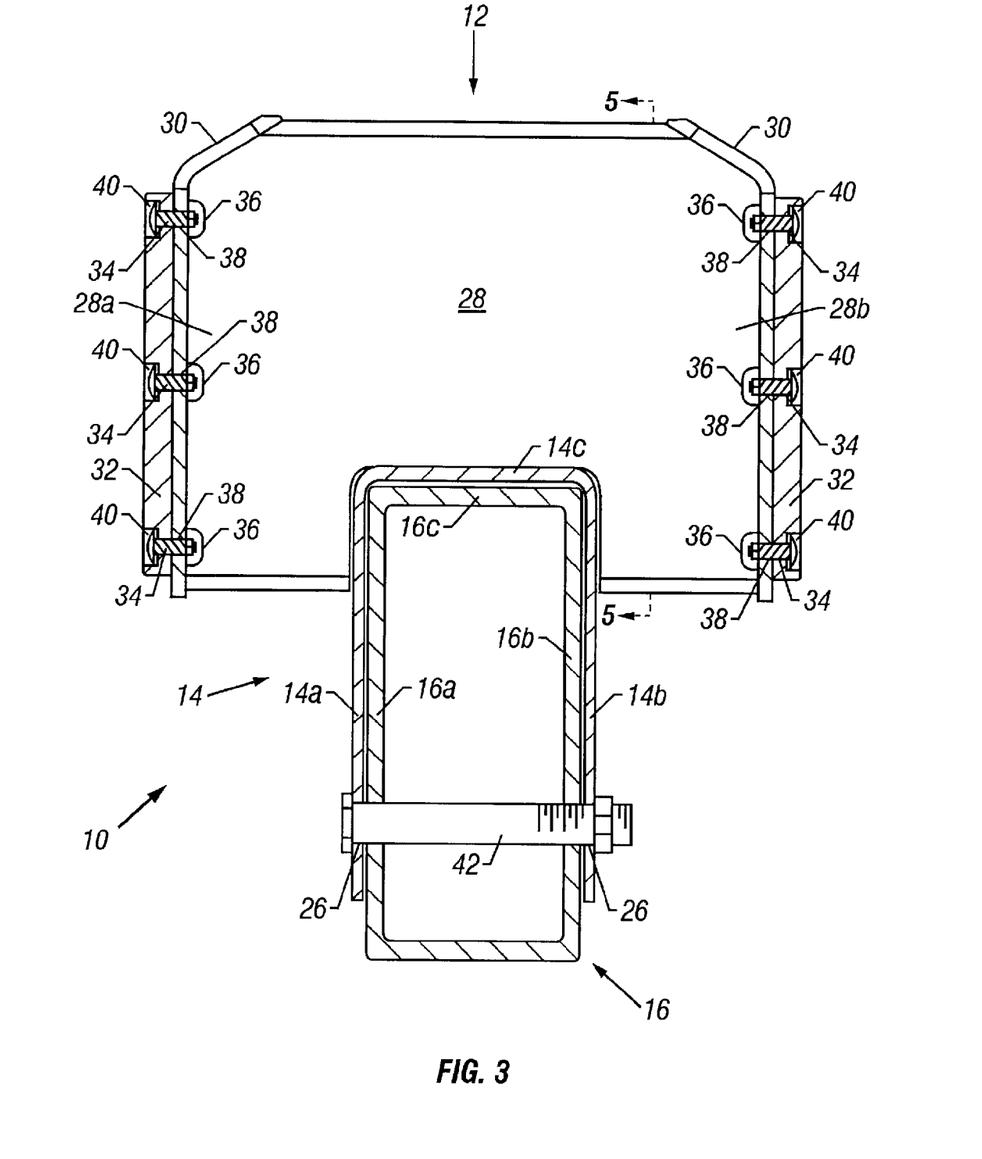
FIG. 3 is a partial cross-sectional view of the jackknife blocking device of FIG. 1 secured to the tongue.
Figure 4:
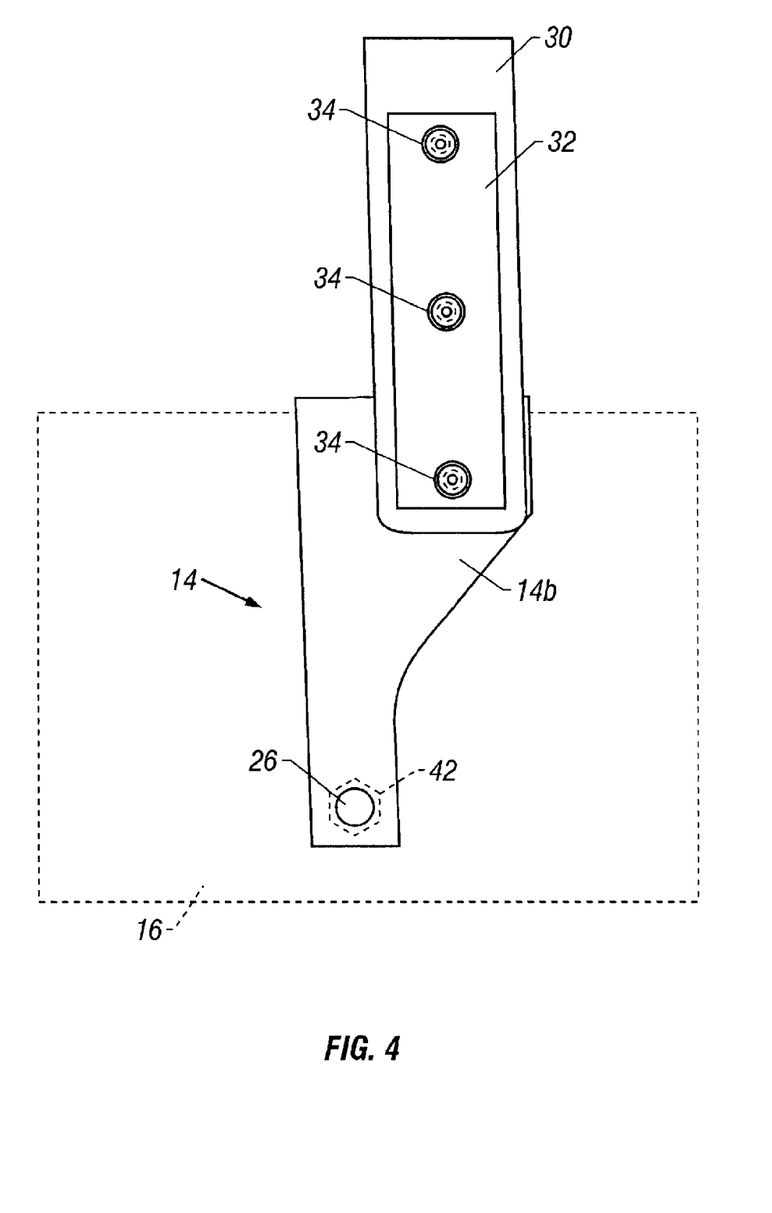
FIG. 4 is a side elevational view of the jackknife blocking device of FIG. 1 showing the trailer tongue in phantom.
Figure 5:
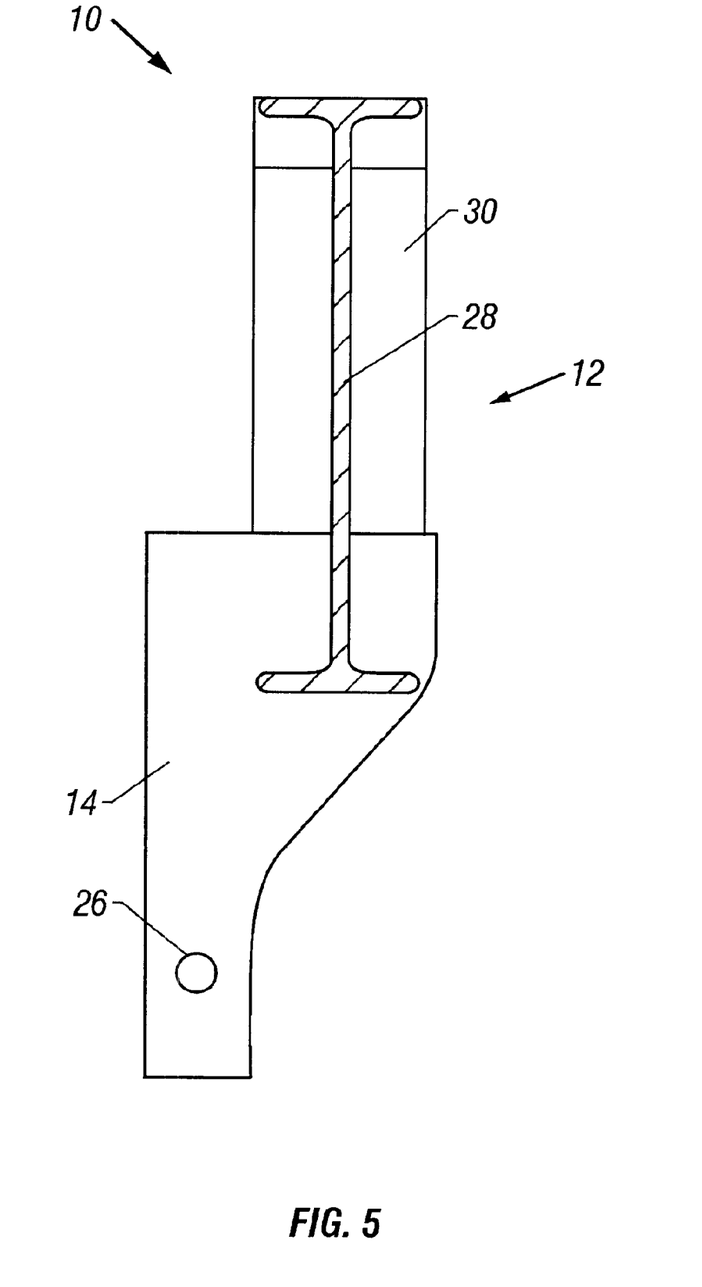
FIG. 5 is a cross-sectional view of the jackknife blocking device of FIG. 1 taken along line 5—5 of FIG. 3.

Referring to FIGS. 3–5, in a preferred embodiment of the present invention, blocking device 10 includes a connection member 14 that is generally unshaped with respect to its transverse axis. The connection member 14 includes side portions 14a, 14b that are spaced apart a predetermined distance, depend downwardly from upper portion 14c and extend generally parallel to one another. Side portions 14a, 14b each have at least one opening 26 defined therein for receiving a fastener, thereby facilitating fastening of connection member 14 to trailer tongue 16, as best shown in FIG. 3. It will be understood that any number of openings 26 can be defined in either of side portions 14a, 14b.

Rigidly secured to connection member 14 such that it extends upwardly and outwardly therefrom is the contact portion 12. The contact portion 12 includes a middle portion 28. Preferably middle portion 28 is I-shaped with respect to its transverse axis, as illustrated in FIG. 5, however, middle portion 28 can be T-shaped, rectangular (hollow or solid) or other shape. Secured to opposite ends of middle portion 28 are a pair of end portions 30. Preferably, affixed to end portions 30 are a pair of pads 32 that are comprised of an elastomeric or other resilient material. The pads 32 are secured to end portions 30 by rivets 34, bolts, screws, adhesive or other fastening means. As illustrated in FIG. 3, a plurality of recesses 36 are defined in middle portion 28 to allow clearance for the distal end of the rivets 34. The recesses correspond to openings 38 defined in end portions 30 and openings 40 defined in pads 32 through which the rivets 34 extend.

In a preferred embodiment, all of the components of the blocking device 10 except for the pads 32 are comprised of a rigid material, such as steel, iron or other metal, and are welded together. However, the entire blocking device 10 or separate components thereof can be comprised of other materials that can stand the required forces according to the intended application, such as a rigid plastic, wood or the like. Those skilled in the art can readily make such a determination. Also, the components of the blocking device 10 can be affixed to one another by gluing or with threaded fasteners or other conventional attachment or connection methods. Furthermore, the entire blocking device 10 can be formed as one unit, for example, by casting. It will be understood that the material used and the method of affixing components to one another are not intended to be limitations on the present invention.

Connection member 14 is sized such that side portions 14a, 14b can preferably be placed adjacent opposite outside surfaces 16a, 16b of tongue 16. An upper portion 14c of connection member 14 seats on the top surface 16c of tongue 16. Blocking device 10 is affixed to tongue 16 by extending at least one bolt 42 or other fastener through opening 26 in either or both of side portions 14a, 14b. The bolt 42 can be extended through an existing opening in tongue 16, or an appropriate opening can be defined in tongue 16 via drilling or the like. It will be understood that pins, rods, other threaded fasteners or the like can be used to removably secure blocking device 10 to tongue 16. Alternatively, blocking device 16 can be permanently affixed to tongue 16 by welding, adhesive or the like.

As best illustrated in FIG. 1, when secured in place, blocking device 10 extends laterally beyond tongue 16 such that when the trailer jackknifes, blocking device 10 comes into contact with bumper 22 (or in the absence of a bumper, the rear portion of the towing vehicle) before tongue 16. Therefore, the tongue 16 (and ultimately the trailer) is substantially prevented from over-articulating, thereby substantially preventing damage. As used herein, tongue 16 refers to the trailer tongue and any components, such as a brake actuator, affixed thereto. When blocking device 10 contacts bumper 22 resilient pad 32 absorbs a portion of the energy generated by the impact, thereby minimizing cosmetic damage. The "bump" generated by this impact is generally sensed by the driver of the towing vehicle, thereby providing warning that vehicle movement should not be continued. It will be understood that other shock absorbing means are within the scope of the present invention. For example, springs or a perishable insert can be used.

As shown in FIG. 2, the embodiment of the present invention described hereinabove is designed so as to work best in a situation wherein the extended plane of the top surface 16c of the tongue 16 is spaced below the extended plane of the bottom surface 22a of the rear bumper 22 of the towing vehicle 20. It will be understood however, that those skilled in the art will be able to make sufficient modifications to the present invention such that the blocking device 10 can work in situations wherein the extended plane of the top surface 16c of the tongue 16 is parallel to or above the extended plane of the bottom surface 22a of the bumper 22 of the towing vehicle 20. It is only necessary that the blocking device 10 extend in a lateral direction far enough to contact the rear bumper 22 or other rear portion of the towing vehicle 20 before the tongue 16 or other portion of the trailer contacts the towing vehicle 20. All such modifications are within the scope of the present invention. It will further be understood that the blocking device 10 will not prevent damage in certain major accidents or in a backing situation wherein the operator of the towing vehicle continues to back-up when the blocking device 10 has already made contact with the bumper 10.

Figure 6:
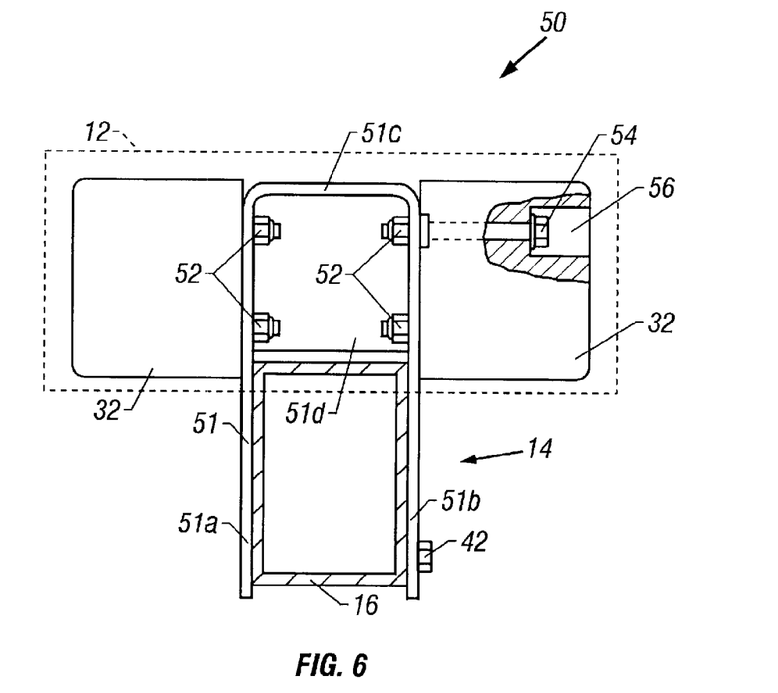
FIG. 6 is a front elevational view of a jackknife blocking device in accordance with a second embodiment of the present invention.
Figure 7:
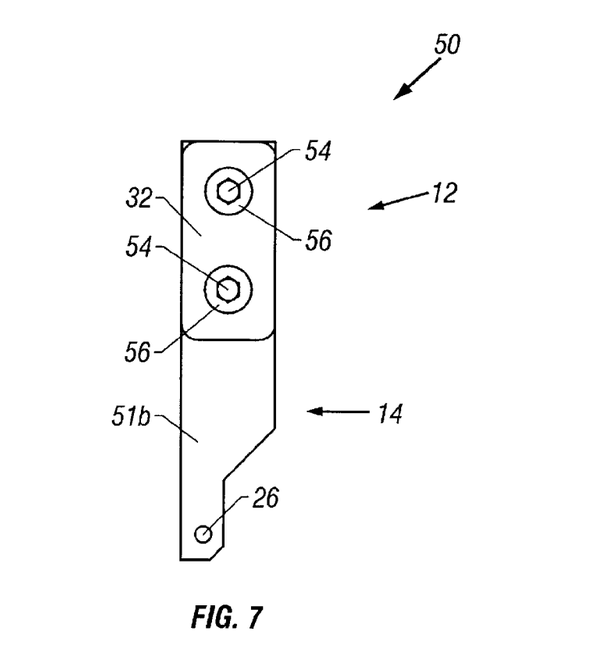
FIG. 7 is a side elevational view of the jackknife blocking device of FIG. 6.

Referring to FIGS. 6–7, a second embodiment of a blocking device 50 according to the present invention is shown. Blocking device 50 includes a contact portion 12 and a connection member 14. As shown, U-shaped bracket 51 has a top portion 51c and a pair of spaced apart, downwardly depending side portions 51a, 51b. A pair of pads 32 are affixed to and extend outwardly from the bracket 51. Preferably, the contact portion 12 includes the pads 32, the part of the U-shaped bracket 51 to which the pads 32 are affixed and a horizontally oriented crush plate 51d, which extends between the side portions 51a, 51b. As best shown in FIG. 6, connection member 14 includes the part of the side portions 51a, 51b that is adapted to engage trailer tongue 16.

The pads 32 are relatively thick and are secured to the side portions 51a, 51b by a threaded fastener, such as a nut 52 and bolt 54 combination. The bolts 54 extend through openings 56 defined in pad 32. The side portions 51a, 51b include at least one opening 26 defined therein for receiving a threaded fastener, pin or the like for connecting the blocking device 50 to trailer tongue 16.

Figure 8:
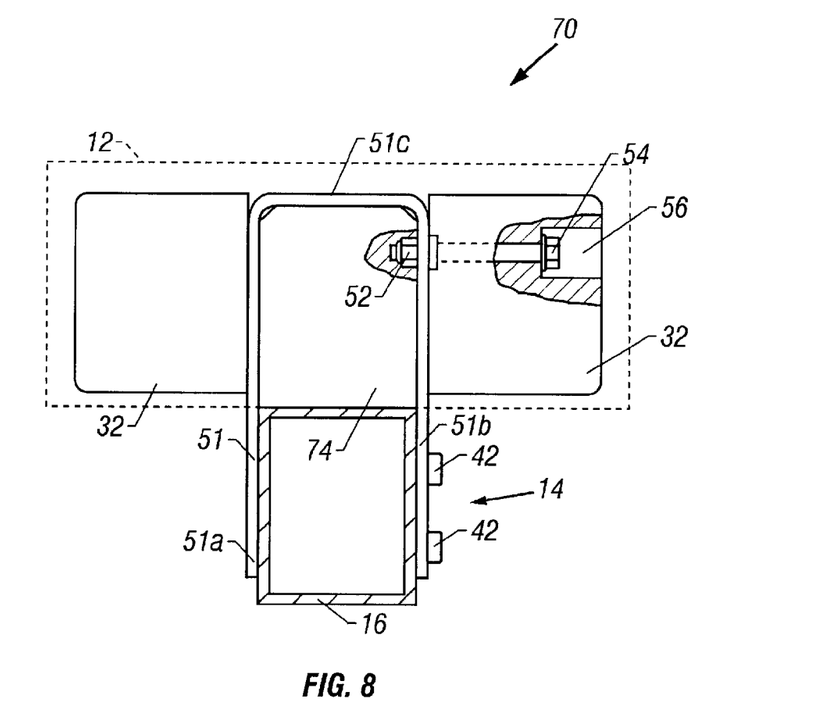
FIG. 8 is a front elevational view of a jackknife blocking device in accordance with a third embodiment of the present invention.
Figure 9:
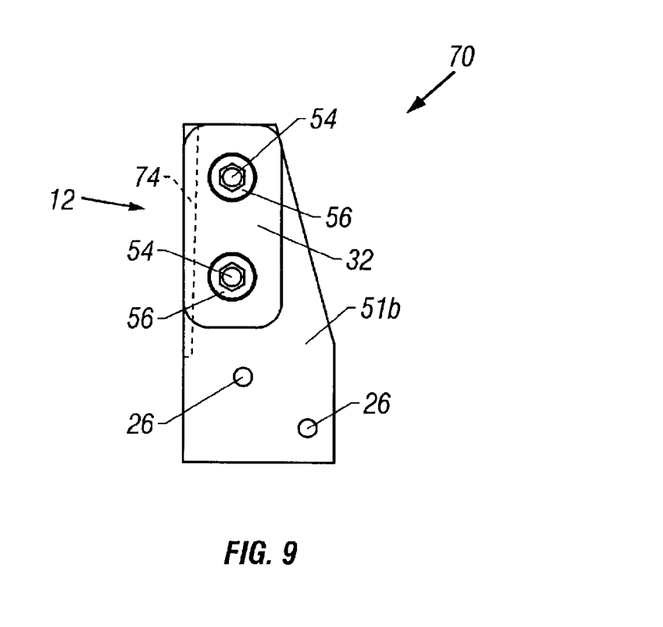
FIG. 9 is a side elevational view of the jackknife blocking device of FIG. 8.

Referring to FIGS. 8–9, a third embodiment of a blocking device 70 is shown. Blocking device 70 includes a contact portion 12 and a connection member 14. U-shaped bracket 51 has a pair of spaced apart, downwardly depending side portions 51a, 51b and a top portion 51c. Pads 32 are affixed to and extend outwardly from the bracket 51. Preferably, the contact portion 12 includes the pads 32, the part of the U-shaped bracket 51 to which the pads 32 are affixed and a vertically oriented crush plate 74, which extends between the side portions 51a, 51b and below top portion 51c.

As best shown in FIG. 8, connection member 14 includes the part of the side portions 51a, 51b that is adapted to engage trailer tongue 16, and a bottom edge of vertically oriented crush plate 74. Pads 32 are affixed to side portions 51a, 51b by a threaded fastener, such as a nut 52 and bolt 54 combination, as described above. The pads 32 extend outwardly of tongue 16. At least one opening 26 is defined in side portions 51a, 51b for connection to trailer tongue 16.

The embodiments of the present invention recited herein are intended to be merely exemplary and those skilled in the art will be able to make numerous modifications to them without departing from the spirit of the present invention. For example, in the first embodiment 10 the pads 32 can be omitted; the contact portion 12 may only extend laterally to one side of the tongue 16. In the second and third embodiments 50, 70 the crush plates 51d and 74, respectively may be omitted. All such modifications are intended to be within the scope of the present invention as defined by the claims appended hereto.

What is claimed is:

1. A device for preventing over-articulation of a trailer having a tongue towed by a towing vehicle, said device comprising:
    (a) a connection member including a pair of spaced apart, downwardly depending side portions, wherein said connection member is adapted to be secured to said trailer tongue, and
    (b) a contact portion affixed to and extending upwardly and outwardly from said connection member, said contact portion having at least one outside surface that is adapted to contact said towing vehicle in the event of a jackknife.

2. The device of claim 1 wherein said connection member includes at least one opening in at least one of said side portions for receiving a fastener for securing said device to said trailer tongue.

3. The device of claim 2 wherein said contact portion comprises
    a crush plate affixed to said connection member, wherein said crush plate has opposite ends, and
    a pair of end portions affixed to said opposite ends of said crush plate.

4. The device of claim 3 wherein said end portions each include a shock absorbing member affixed thereto.

5. The device of claim 4 wherein said crush plate includes a plurality of recesses defined therein, and wherein each shock absorbing member is affixed to each end portion by at least one fastener extending through said shock absorbing member and said end portion and into one of said recesses.

6. The device of claim 5 wherein said fastener is a rivet.

7. The device of claim 3 wherein said crush plate has an I-shaped cross-section.

8. The device of claim 1 wherein said contact portion includes opposite vertically oriented ends, wherein each end each having an outside surface extends outwardly of said tongue in a horizontal direction.

9. The device of claim 8 wherein said contact portion includes a shock absorbing member affixed to said outside surface of each vertically oriented end.

10. The device of claim 9 wherein said shock absorbing members comprise an elastomeric material.

11. The device of claim 1 wherein said contact portion includes a crush plate and a pair of shock absorbing members extending outwardly from said crush plate, wherein said shock absorbing members extend outwardly of said tongue in a horizontal direction.

12. A trailer and towing vehicle in combination, said trailer having a tongue with a body affixed thereto, said body extending outwardly of said tongue and including a lower portion affixed to said tongue and an upper portion, wherein said tongue has an upper surface and said towing vehicle has a rear bumper portion with a lower surface, said upper surface of said tongue and said lower surface of said rear bumper portion defining first and second planes, respectively, wherein said first plane is below said second plane, and wherein said upper portion of said body extends upwardly from said trailer tongue above said first and second planes, and wherein said lower portion includes a connection member including a pair of spaced apart, downwardly depending side portions, wherein said connection member is secured to said trailer tongue, and, said upper portion includes a contact portion affixed to and extending outwardly from said connection member.

13. A device for preventing over-articulation of a trailer towed by a towing vehicle, said device comprising:
    (a) a bracket including
        (i) a horizontally oriented upper portion, and
        (ii) a pair of side portions extending downwardly from said upper portion and adapted to engage a tongue of said trailer, and
    (b) a pair of opposed shock absorbing members affixed to and extending outwardly from said bracket.

14. The device of claim 13 further comprising a crush plate extending between said pair of side portions.

15. The device of claim 14 wherein said crush plate is vertically oriented.

16. The device of claim 15 wherein said shock absorbing members are affixed to said bracket by a threaded fastener.

17. The device of claim 14 wherein said crush plate is horizontally oriented.

18. A trailer comprising:
    a) a trailer body,
    b) a tongue extending forwardly from said trailer body,
    c) a device for preventing over-articulation of said trailer when towed by a towing vehicle, said device including:
        i) a connection member including a pair of spaced apart, downwardly depending side portions, wherein said connection member is secured to said trailer tongue, and
        ii) a contact portion affixed to and extending outwardly from said connection member.

19. The trailer of claim 18 wherein said tongue includes top and bottom and first and second opposing side surfaces, wherein said downwardly depending side portions of said connection member engage said opposing side surfaces of said tongue.

20. The trailer of claim 19 further comprising at least one opening defined in at least one of said side portions, and at least one fastener extending through said at least one opening and securing said device to said tongue.

21. The trailer of claim 19 further comprising at least one shock absorbing member affixed to and extending outwardly from said contact portion.

22. A device for preventing over-articulation of a trailer towed by a towing vehicle, said device comprising:
(a) a connection member including a pair of spaced apart, downwardly depending side portions, whereby said connection member is adapted to engage a tongue of said trailer, and
(b) a contact portion affixed to and extending upwardly and outwardly from said connection member, said contact portion including opposite vertically oriented end portions and a crush plate having opposite ends extending therebetween.

23. The device of claim 22 wherein said connection member includes a horizontally oriented upper portion, wherein said crush plate is affixed to said upper portion and said end portions are affixed to said opposite ends of said crush plate.

24. The device of claim 23 wherein said end portions each include a shock absorbing member affixed thereto.

* * * * *